ically Patent [19]
Greskovich et al.

[11] 3,897,358
[45] July 29, 1975

[54] POLYCRYSTALLINE CERAMIC LASERS
[75] Inventors: Charles D. Greskovich; Walter L. Roth, both of Schenectady, N.Y.
[73] Assignee: General Electric Company, Schenectady, N.Y.
[22] Filed: Dec. 14, 1973
[21] Appl. No.: 424,809

Related U.S. Application Data
[63] Continuation-in-part of Ser. No. 294,017, March 1, 1971, abandoned.

[52] U.S. Cl............ 252/301.1 R; 106/39.5; 106/55; 106/65
[51] Int. Cl.²........................................ C09K 11/04
[58] Field of Search............ 252/361.1 R; 106/39.5, 106/55, 65; 423/15, 252

[56] References Cited
UNITED STATES PATENTS
3,453,215  7/1969  Carnall, Jr. et al. ......... 252/301.1 R
3,640,887  2/1972  Anderson..................... 252/301.1 R
3,641,227  2/1972  Horsley et al................ 252/301.1 R Primary Examiner—Benjamin R. Padgett
Assistant Examiner—Deborah L. Kyle
Attorney, Agent, or Firm—Jane M. Binkowski; Joseph T. Cohen; Jerome C. Squillaro

[57] ABSTRACT

A method of making a laser body from a high density yttria-based ceramic material is provided. The method involves forming an aqueous solution containing water soluble salts of yttrium, thorium and neodymium, co-precipitating the cations from solution with oxalic acid, recovering the oxalate precipitate in the form of a purified dried powder, calcining the powder to convert the oxalates to the oxides, particulating the oxides in a rubber-lined ball mill, pressing the powdered oxides into a "green body", sintering the "green body" in a hydrogen atmosphere and rapidly cooling the sintered body to form an improved lasing ceramic material.

7 Claims, 3 Drawing Figures

POLYCRYSTALLINE CERAMIC LASERS

This is a continuation-in-part of application Ser. No. 294,017, filed Mar. 1, 1971 now abandoned.

The invention herein described was made in the course of or under an Advanced Research Projects Agency contract and monitored by the Office of Naval Research.

Recently, there has been a considerable amount of development in the manufacture of laser instruments and systems. The construction and alignment industries are the major users of these instruments with emerging markets in the fields of office equipment, data processing and communications.

The ability to generate laser radiation having both high-peak power and high-average power is important for the development of high-speed tracking and illuminating devices. Conventional laser materials considered for these applications in the neodymium wave length region of about 1.06 $\mu$ are Yttrium Aluminum Garnet (YAG) and glass. Both of the materials, however, suffer from certain deficiencies. The single-crystal YAG exhibits high-average power because of its high thermal conductivity, but low peak power because of its high gain. Also, the tedious growth of YAG single crystals introduces the further disadvantages of high cost and limited size. In comparison, the glass laser produces high-peak power because of its low gain, but has low-average power because of its poor thermal conductivity. Thus, using conventional rod design, high-peak power at high-average power cannot be easily achieved with either neodymium doped YAG or glass.

Heretofore, R. C. Anderson, U.S. Pat. No. 3,640,887 disclosed the preparation of a ceramic composition containing 88 mole percent yttria, 10 mole percent thoria and 2 mole percent neodymium oxide. The transparent body was found to fluoresce at approximately 1.06 microns and to be an active laser medium. The process described in the patent involves preparing the proper mixture of ingredients, pressing to green density and then sintering to final density. The sintering is performed at temperatures ranging between 1900°-2200° and the samples are raised to the sintering temperature at rates ranging from 20°-200° C. per hour. Then, at the end of the sintering process, the samples are cooled at a similar rate. Unfortunately, the best product prepared by the process of Anderson has a porosity of about $5 \times 10^{-6}$ and a low lasing efficiency of about 0.01%.

In accordance with the present invention, we have discovered a process for producing an improved yttria-based ceramic laser having a porosity of $10^{-6}$ to $10^{-7}$ and an increased lasing efficiency. Our novel process comprises forming an aqueous solution containing water soluble salts of yttrium, thorium and neodymium, coprecipitating the cations from solution with oxalic acid, recovering the oxalate precipitate in the form of a purified dried powder, calcining the powder to convert the oxalates to the corresponding oxides, particulating the oxides in a rubber-lined ball mill, pressing the powdered oxides into a "green body", sintering the "green body" in a hydrogen atmosphere and rapidly cooling the sintered body to form a lasing ceramic material having improved properties. High-peak power and high-average power can be achieved with these lasing ceramic materials.

The invention is more clearly understood from the following description taken in conjunction with the accompanying drawing in which.

Figure 1:
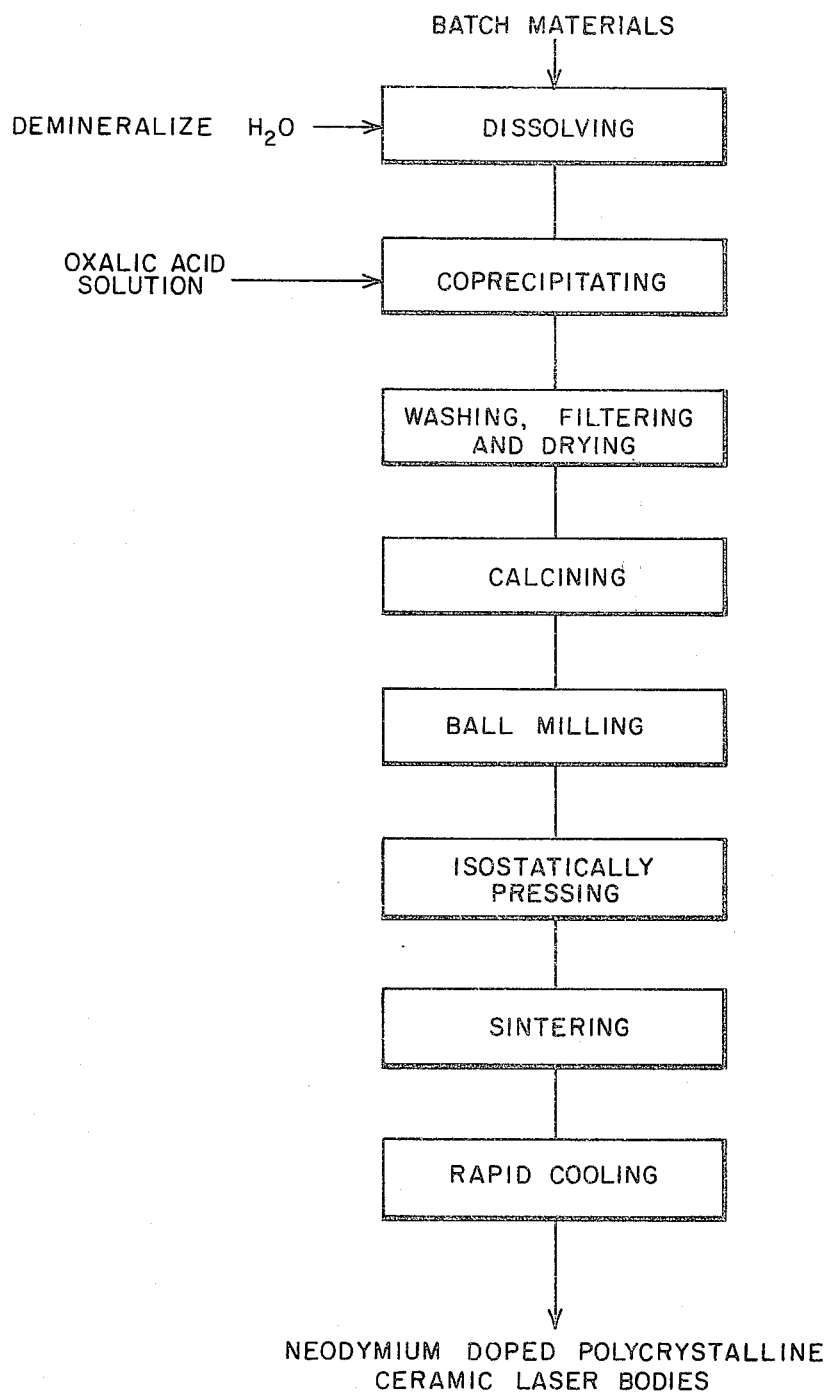
FIG. 1 is a general flow diagram for producing the yttria-based ceramic laser in accordance with the process of our invention.

The yttria-based ceramic laser prepared by the process of our invention consists essentially in mole percent as calculated from the batch on the oxide basis of 81–97.5% $Y_2O_3$, 2–15% $ThO_2$ and 0.5–4.0% $Nd_2O_3$. The addition of thoria in the yttria-based ceramic composition acts as a densifying aid during sintering in order to achieve transparency. The thoria reduces grain boundary mobility during the sintering process and permits most pores to disappear rather than become included in the grains. A sufficient amount of neodymium oxide must be present to impart the lasing properties to the product. The presence of neodymium oxide in the range of 0.5–4.0 mole percent provides a sky blue color and a fluorescence in the infrared region at 1.078 microns.

Initially high purity batch materials are dissolved in an aqueous solution. It is thus an important requirement that the salt of the raw material be highly water soluble. In addition, the anion should be capable of being readily removed during the washing procedure and not form complexes or insoluble products. The salts which are most soluble are the nitrates, the sulfates and the halides. Of these, we have found that the best results are obtained by using the nitrates. Satisfactory results may also be obtained using the soluble halides of which the chlorides appear to be preferred. Mixtures of the water soluble salts may also be used. The sulfates are less desirable because they create difficulties concerning sulfur removal in the final sintering step. The yttrium nitrates available include $Y(NO_3)_3 \cdot 6H_2O$ and $Y(NO_3)_3 \cdot 4H_2O$; the thorium nitrates available include $Th(NO_3)_4$, $Th(NO_3)_4 \cdot 4H_2O$, $Th(NO_3)_4 \cdot 12H_2O$; and the neodymium nitrate is available as $Nd(NO_3)_3 \cdot 6H_2O$. Usually the high purity salts are dissolved in deionized water. The aqueous solution is then filtered, if necessary, to remove any undissolved material or impurities which may be present.

The salt solution is then coprecipitated with a precipitant in which the yttrium, thorium and neodymium compounds are insoluble. The precipitant should initially be readily water soluble and also such that the excess can be readily removed by washing with water after coprecipitation. In addition, in selecting the precipitant, it is necessary that the resulting precipitate be either amorphous or crystalline in structure, readily washable in water to remove impurities and nongelatinous substances. As another requirement, the precipitate must be such that, upon heating at elevated temperatures, it is readily converted to the corresponding oxides. The most suitable precipitant that we have found is oxalic acid having the formula $H_2C_2O_4$. The oxalic acid is dissolved in deionized water to form a concentrated aqueous solution to which the salt solution is gradually added with constant stirring. The initial pH of the precipitating solution is strongly acid, e.g. a pH of about 1.0. Attempts to coprecipitate the salts as the carbonates or hydroxides were unsatisfactory since gelatinous precipitates are formed.

The precipitate is then removed from the solution by filtering and washing with distilled water. After the precipitate has been thoroughly washed, it is dried at elevated temperatures up to about 110° C. to remove physically adsorbed water.

The dried powder is placed in an alumina crucible and calcined to convert the oxalates to the corresponding oxides. Typically, calcination is at a temperature of about 850° C. for a sufficient time, e.g. about 4 hours.

Thereafter, the calcined powder is ball milled in a rubber-lined ball mill containing yttria-based ceramic balls (10 mole percent $ThO_2$ and 90 mole percent $Y_2O_3$). The milling is typically done in the presence of an organic lubricant, such as stearic acid or oleic acid, which may be readily removed on subsequent firing. The ball milling is particularly important in that it breaks down powder agglomerates that could result in large pores in final product, produces a substantially uniformly sized powder for subsequent isostatic pressing, and provides a substantially homogeneous dispersion of the ingredients. We have found that proper ball milling results in a large simultaneous reduction in residual porosity and in variations in the index of refraction in the sintered product. After ball milling, the milled calcined powder contains about 0.2 by weight of sulfur which is introduced from the vulcanized rubber lining of the ball mill. It is believed that the presence of the sulfur promotes pore elimination during subsequent sintering. As the calcined powder densifies at the elevated sintering temperatures, a fine dispersion of a liquid phase rich in sulfur occurs at the grain boundaries. The liquid phase is completely removed from the sintered product after prolonged annealing times at high temperatures. Thus, the sulfur-rich liquid phase is present during sintering as a transient phase and essentially has no detrimental effects on the properties of the final sintered product.

The ball milled powder is then formed or shaped using conventional techniques. Thus, for example, rods may be fabricated by isostatically pressing the powder at a pressure of about 30,000 psi. The article after it has been isostatically pressed is designated as a "green body" and may be machined to the desired dimensions or size. An alternative method of forming would be to use hot pressing techniques.

Thereafter, the "green body" is sintered or fired at elevated temperatures to form a high density yttria-based ceramic material. Generally, the sintering temperature is in the range of 1900°–2200° C. and preferably 2000°–2200°. The optimum sintering temperature will vary somewhat depending on the composition of the material. More specifically, sintering is effected by firing in a suitable furnace, such as a tungsten resistance heating furnace, in the presence of a dry hydrogen atmosphere. The samples are raised to the sintering temperature at rates ranging between about 20°–900° C. per hour for a time sufficient to produce complete sintering and to establish thermodynamic equilibrium. At this point, the material is a single-phase, random solid solution. In a preferred embodiment, the sample is sintered in dry hydrogen at a temperature of 2170° C. for times up to 125 hours.

Figure 2:
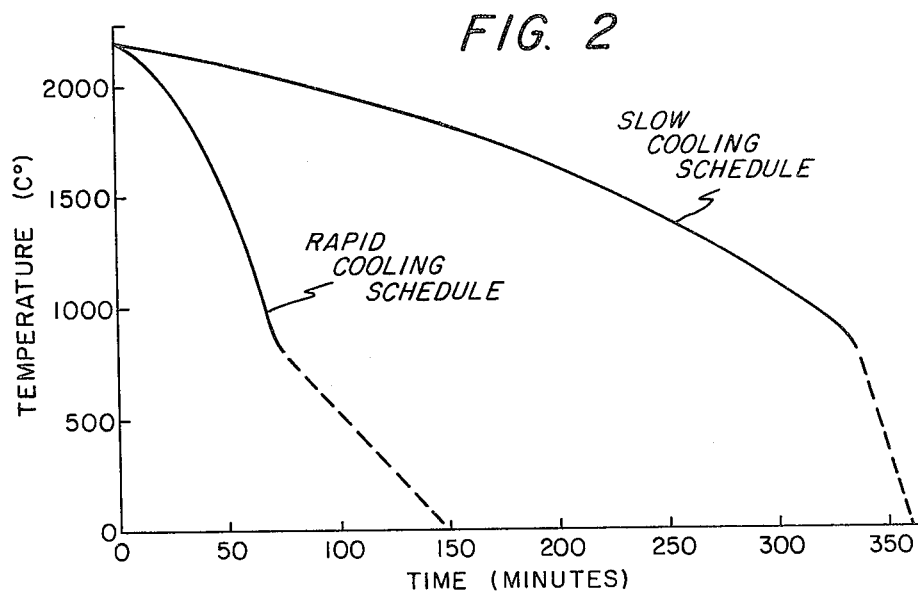
FIG. 2 is a graphic representation of comparative cooling schedules of samples after sintering.

Finally, a critical step in our invention is the rapid cooling of the sintered material. The purpose of rapid cooling is to retard or prevent the formation of ordered regions which may form variations in composition. By appropriate rapid cooling, without specimen cracking, either the ordered regions will be absent or so insignificantly small that the light scattering cross sections will be small. The rapid cooling rate should be in the range of about 10°–80° C. per minute between about 2200° C. and 800° C. Microstructural transformations below 800° C. are minimal. A typical cooling schedule is shown in FIG. 2 for the curve designated as Rapid Cooling Schedule in which the cooling between 2170° C. to 800° C. is at a rate of about 20° C. per minute. This technique produces neodymium-doped yttria-based ceramic lasers with higher lasing efficiencies, lower active loss coefficients and lower laser thresholds than slowly cooled specimens such as those described in the Anderson patent previously cited.

As used herein the terms "laser threshold energy," "active loss coefficient," and "lasing slope efficiency" have the following meaning. The "laser threshold energy" is defined as the pump light energy required to produce the spiking characteristics commonly observed in pulsed, solid-state lasers at a given output mirror reflectivity. "Active loss coefficient" is the total internal losses of the solid-state laser determined from the laser threshold energy for different output mirror reflectivities. The slope of the energy output versus energy input curve obtained at a given output mirror reflectivity is designated the "lasing slope efficiency."

Figure 3:
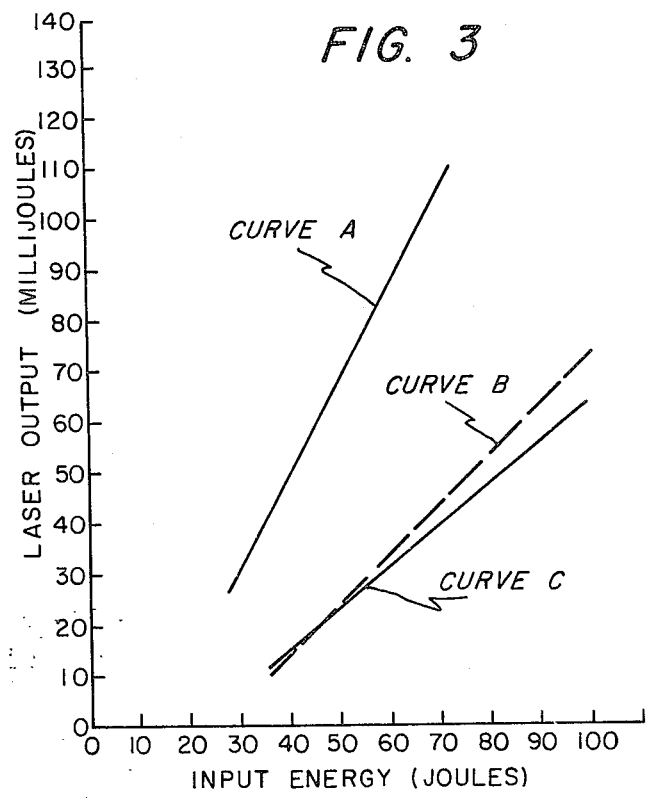
FIG. 3 shows comparative data for the lasing slope efficiency of samples prepared according to the cooling schedules shown in FIG. 2.

Now with reference to FIG. 2, a comparison is illustrated between a representative rapid cooling schedule and a representative slow cooling schedule. In the curves shown, the most significant portion of the cooling is down to about 800° C. which is designated by a solid line, while the remaining portion from 800° C. to room temperature is designated by a broken line. The rate of cooling is determined by the decrease in temperature as a function of time. FIG. 3 shows the lasing slope efficiency of samples prepared according to the cooling schedules shown in FIG. 2. Curve A corresponds to a sample prepared by the rapid cooling schedule, while curves B and C correspond to samples prepared by the slow cooling schedule. It is readily apparent that the lasing slope efficiency of the rapidly cooled sample is substantially superior to the slowly cooled sample.

Our invention is further illustrated by the following examples:

EXAMPLE I

A preferred neodymium oxide doped polycrystalline ceramic article was prepared and sintered from the following formulation:

| Oxide | Mole Percent | Batch Material | Weight Grams |
|---|---|---|---|
| $Nd_2O_3$ | 1.0 | $Nd(NO_3)_3 \cdot 6H_2O$ | 5.67 |
| $ThO_2$ | 10.0 | $Th(NO_3)_4 \cdot 4H_2O$ | 35.7 |
| $Y_2O_3$ | 89.0 | $Y(NO_3)_3 \cdot 6H_2O$ | 443.7 |

The nitrate salts were dissolved in 450 ml. of filtered deionized water and the solution was then filtered to remove any undissolved impurities. Then 471 gms. of oxalic acid ($H_2C_2O_4 \cdot 2H_2O$) were dissolved in 5750 ml. of filtered deionized water to provide a solution which was 80% saturated and contained at least a 100% excess of oxalic acid required to convert the nitrates into the corresponding oxalates. The oxalic acid solution was filtered.

The nitrate solution was then poured into a large dispensing buret and the solution was then dripped slowly at the rate of 2.5 ml./min. into the oxalic acid solution with constant stirring. A white precipitate was formed and was permitted to settle to the bottom of the reaction vessel. The clear liquid was drained off and the oxalate precipitate was washed with filtered deionized water. Thereafter the oxalate precipitate was vacuum filtered and dried for 12 hours in air at 110° C. The dried precipitate was then calcined at 800° C. for 4 hours.

To the calcined powder was added 1% by weight of stearic acid and the powder was ball milled in a rubber-lined mill containing balls having the composition of 10 mole percent $ThO_2$ and 90 mole percent $Y_2O_3$. The milling was continued for 6 hours. Then the powder was isostatically pressed into rod shaped specimens at a pressure of 40,000 psi. The rods were calcined in air at 1100° C. for 2 hours.

Thereafter, the rods were fired in a dry hydrogen atmosphere in a tungsten resistance heating furnace using a 6 hour heating cycle to 2170° C. The rods were sintered at 2170° C. in dry hydrogen for about 125 hours.

Finally, the rods were cooled for 5½ hours to 800° C. and then to room temperature in a half hour in the presence of a wet hydrogen atmosphere (dew point about 25° C.). The cooling schedule is shown in FIG. 2 and designated as the "slow cooling schedule." The lasing slope efficiency of rods ¼ inch in diameter and 3 inches long is shown in Curve C of FIG. 3.

EXAMPLE II

Following the procedure and using the ingredients of Example I, neodymium doped yttria-based laser rods were formed and cooled according to the slow cooling schedule. The lasing slope efficiency of rods ¼ inch in diameter and 3 inches long is shown in Curve B of FIG. 3. It should be noted that the properties of rods are similar to those of Example I and indicates that substantially reproducible lasing properties are obtained following the slow cooling schedule.

EXAMPLE III

Following the procedure and using the ingredients of Example I, neodymium doped yttria-based laser rods were formed and cooled according to the slow cooling schedule. The rods were then reheated to the sintering temperature of 2170° C. and equilibrated for 2 hours only so that very little sintering, if any, occurred. Then the sample was cooled according to the rapid cooling schedule in FIG. 2. The lasing slope efficiency is shown in Curve A of FIG. 3. A comparison in properties of the lasing rods prepared in Examples I–III is set forth in the table below:

Lasing Characteristics of the Ceramic Rods

| Example | Cooling Schedule | Laser Threshold (joules) | Slope Efficiency at 80% Reflectivity | Loss Coefficient (% per cm.) |
| --- | --- | --- | --- | --- |
| I | slow | 16.0 | 0.081 | 4.90 |
| II | slow | 21.0 | 0.098 | 5.40 |
| III | rapid | 8.1 | 0.19 | 2.60 |
| Glass[a] | — | 9.0 | 0.44 | 0.76 |

[a]Owens Illinois Glass FD-2, a lasing glass, having identical dimensions is used as a standard.

In interpreting the values of the table, a standard lasing material, a neodymium doped laser glass, was used as a reference material since the absolute lasing values depend on the apparatus and testing conditions. A comparison of the lasing properties of the samples prepared in Examples I and III as shown in the table indicate that the rapid cooling schedule reduced the lasing threshold by 49%, reduced the loss coefficient by 47%, and increased the lasing slope efficiency by 135%. When the properties of the ceramic laser of Example III are compared to those of glass, the ceramic laser has achieved a lower threshold than the laser glass and a lasing slope efficiency approximately 43% of that of the glass laser. A lasing efficiency of such a high magnitude is quite surprising and has not heretofore been known or observed in polycrystalline ceramic materials.

EXAMPLE IV

Following the procedure of Example III, a neodymium oxide doped polycrystalline ceramic article was prepared and sintered from the following formulation:

| Oxide | Mole Percent | Batch Material | Weight Grams |
| --- | --- | --- | --- |
| $Nd_2O_3$ | 1.0 | $Nd(NO_3)_3 \cdot 6H_2O$ | 5.67 |
| $ThO_2$ | 5.0 | $Th(NO_3)_4 \cdot 4H_2O$ | 18.78 |
| $Y_2O_3$ | 94.0 | $Y(NO_3)_3 \cdot 6H_2O$ | 472.10 |

The rods were formed and sintered at a temperature of 2170° C. The rods were then rapidly cooled according to the rapid cooling schedule in FIG. 2.

The laser rods were characterized by a laser threshold of 7.8 joules, an attenuation coefficient of 2% per cm. and a lasing slope efficiency of 0.34% at 80% reflectivity.

EXAMPLE V

Following the procedure of Example IV, a neodymium oxide doped polycrystalline ceramic material was prepared and sintered from the following formulation:

| Oxide | Mole Percent | Batch Material | Weight Grams |
| --- | --- | --- | --- |
| $Nd_2O_3$ | 1.0 | $Nd(NO_3)_3 \cdot 6H_2O$ | 5.68 |
| $ThO_2$ | 2.5 | $Th(NO_3)_4 \cdot 4H_2O$ | 9.44 |
| $Y_2O_3$ | 96.5 | $Y(NO_3)_3 \cdot 6H_2O$ | 486.73 |

Lasing rods of good optical quality are prepared from the sintered ceramic material. The fluorescent linewidth of 17A is narrower than for material with higher $ThO_2$ concentrations. This finding indicates that the material has a high gain coefficient for laser radiation.

It will be appreciated that the invention is not limited to the specific details shown in the examples and illustrations and that various modifications may be made

We claim:

1. A method of making a ceramic laser consisting essentially in mole percent as calculated from the batch on the oxide basis of 81–97.5 percent $Y_2O_3$, 2–15 percent $ThO_2$ and 0.5–4 percent $Nd_2O_3$, said method comprising the steps of:
   a. forming an aqueous solution consisting essentially of the water soluble salts of yttrium, thorium, and neodymium in an amount corresponding to the percent of oxides set forth above;
   b. coprecipitating the cations from solution with oxalic acid to form an insoluble mixed precipitate of yttrium oxalate, thorium oxalate and neodymium oxalate;
   c. recovering the oxalate precipitate;
   d. calcining the precipitate to convert the oxalates to the oxides;
   e. particulating the oxides in a vulcanized rubber-lined ball mill;
   f. pressing the powdered oxides into a green body;
   g. sintering the green body in a hydrogen atmosphere at a temperature of about 1900°–2200° C.; and
   h. rapidly cooling the sintered body at a rate of 10°–80° C. per minute between the sintering temperature and 800° C. and cooling the body to room temperature to form a polycrystalline ceramic laser.

2. The method of claim 1, wherein the water soluble salts are in the form of the nitrates.

3. The method of claim 2, wherein the ceramic laser consists essentially of 89 mole percent yttria, 10 mole percent thoria, and 1 mole percent neodymium oxide.

4. The method of claim 1, wherein the sintering step is performed at a temperature of 2000°–2200° C. and the green body is raised to the sintering temperature at a rate of 20°–900° C. per hour.

5. The method of claim 1, wherein the sintered body is heated to a temperature of about 2170° C. and then cooled to 800° C. at a rate of about 20° C. per minute.

6. The method of claim 1, wherein the sintered body is initially slowly cooled to room temperature, then reheated to about 2000°–2200° C. for a time sufficient to establish equilibrium, and finally subjected to the rapid cooling step at a rate of 10°–80° C. per minute between the reheating temperature and 800° C.

7. The method of claim 2, wherein the ceramic laser consists essentially of about 94 mole percent yttria, 5 mole percent thoria, and 1 mole percent neodymium oxide.

* * * * *